United States Patent Office 2,702,290
Patented Feb. 15, 1955

2,702,290

METHOD FOR PREPARATION OF CYCLO-PENTANOPHENANTHRENE DERIVATIVES

Franz Sondheimer, Mexico City, Mexico, Carl Djerassi, Birmingham, Mich., and George Rosenkranz, Mexico City, Mexico, assignors to American Syntex Incorporated, Hato Rey, Puerto Rico, a corporation of Puerto Rico No Drawing. Application February 6, 1953,
Serial No. 335,586

Claims priority, application Mexico February 13, 1952

7 Claims. (Cl. 260—239.55)

The present invention relates to a new method for the preparation of cyclopentanophenanthrene derivatives. More particularly, the present invention relates to a new method for the preparation of saturated 11-oxygenated steroids from the corresponding $\Delta^{8(9)}$-11-keto-steroids and especially 22-isoallospirostan-3β,11α-diol(11α-hydroxytigogenin) or 22-isoallospirostan-3β-ol-11-one (11-keto-tigogenin). 11-oxygenated steroids in general and the last mentioned compounds in particular are valuable intermediates for the production of adrenal hormones having 11-oxygenated groups and the present invention provides a novel method for their production.

In United States application, Serial Number 330,362, filed January 8, 1952, there has been disclosed a method for the preparation of $\Delta^{8(9)}$-22-isoallospirosten-3β-ol-11-one as well as a process for the conversion of this compound by catalytic hydrogenation into a saturated 22-isoallospirostan-3β-ol-11-one with an unnatural configuration at certain of the carbon atoms.

In accordance with the present invention the surprising discovery has been made that treatment of $\Delta^{8(9)}$-11-keto steroids and especially $\Delta^{8(9)}$-22-isoallospirosten-3β-ol-11-one and/or esters thereof with lithium or sodium metal in liquid ammonia in the presence of a low molecular weight alcohol saturates the double bond between C–8 and C–9 to give in this instance the normal configuration. Further, at the same time, the keto group at C–11 is reduced to the corresponding 11α-hydroxy group. It has further been discovered in accordance with the present invention, that if the alcohol is omitted, the double bond is saturated but the 11-keto group is not reduced so that the corresponding saturated 11-keto compound is produced.

The following equations illustrate the present invention:

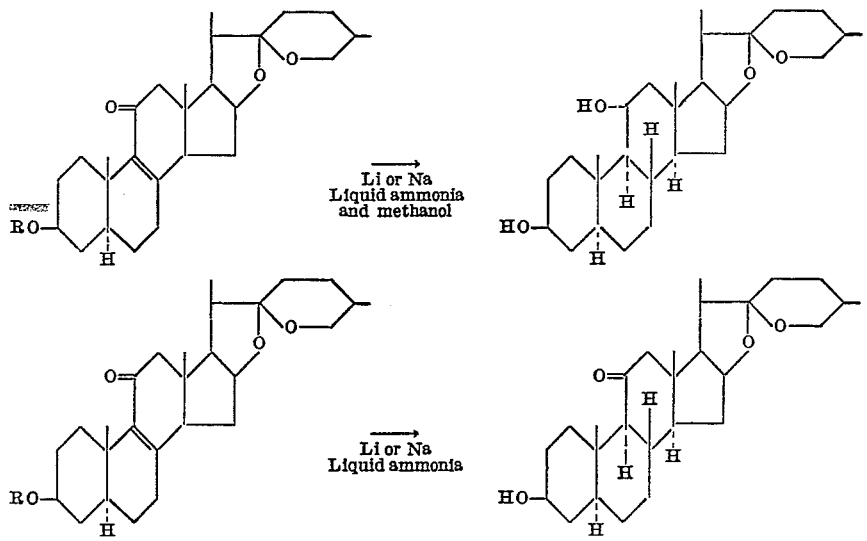

In the above equations, R represents hydrogen or an acyl group, i. e., the residue of any acid normally utilized for the esterification of steroid alcohols. In particular, R may represent the residue of a lower fatty acid such as acetic or propionic or an aromatic acid such as benzoic.

It is further apparent that although in the above equations the present reaction is shown applied to compounds of the steroidal sapogenin series and especially those of the 22-iso series, the method can be applied to any other sapogenins as well as other steroidal compounds providing these other steroidal compounds do not contain any other functional groupings capable of reacting with lithium and/or sodium in ammonia under the conditions hereinafter described.

In practicing the process above outlined, the steroidal $\Delta^{8(9)}$-11-keto compounds such as $\Delta^{8(9)}$-22-isoallospirosten-3β-ol-11-one propionate in a suitable solvent such as dioxane or ether is combined with a solution of lithium or sodium metal in a suitable quantity of liquid ammonia. If it is desired to form the corresponding saturated keto compound, alcohol is not added but if it is desired to form the corresponding saturated 11α-hydroxy compound, then a quantity of anhydrous methanol is also combined with the reaction mixture. The reacting components may be combined in various ways. Thus, the steroid in ether and methanol can be added to the liquid ammonia and to this solution the lithium or sodium metal can be added in small portions for a short period of time, as for example, fifteen minutes, with a wait until the color disappears after each addition. Another specific method for combining the reaction components is to combine the lithium or sodium metal with the liquid ammonia and to add to this solution, the steroid in solid form or an organic solvent. After most of the steroid was added the blue color disappeared and, therefore, in this method of combination it is desirable to add small pieces of lithium or sodium to the reaction mixture at this point until the permanent blue color reappears. Preferably, between three and four molar equivalents of the metal are utilized although the amount of metal used can vary within wide limits since the excess metal remaining at the end of the reaction can be decomposed with any of the known reagents capable of reacting with the metal in liquid ammonia such as tertiary butanol, methanol, ethanol, water or ammonium chloride.

After decomposition of the excess metal, the ammonia is then evaporated and the organic product is extracted with a suitable solvent such as benzene or ether. In some instances, when the reaction is carried with an ester, a partial saponification of the ester group is produced and, therefore, it is advisable to hydrolize, preferably with a saponifying agent such as an alcoholic alkali metal hydroxide, or, in some instances, re-esterify the reaction product.

The following specific examples serve to illustrate but are not intended to limit the present invention:

*Example I*

A solution of 500 mg. of $\Delta^{8(9)}$-22-isoallospirosten-3β- ol-11-one propionate in 20 cc. of anhydrous ether and 5.5 cc. of anhydrous methanol was added to 250 cc. of liquid ammonia. To this solution, 500 mg. of lithium metal were added in small portions in the course of fifteen minutes, waiting until the color disappeared after each addition. Ammonium chloride was added and the ammonia was evaporated. The ether solution of the product was washed to neutral, dried and evaporated to dryness. The residue was crystallized from pentane and further purified by chromatography in a column with alumina. The fractions eluted from the column with ether and ether-chloroform were combined and recrystallized from hexane to give colorless crystals of 22-isoallospirostan-3$\beta$,11$\alpha$-diol with a melting point of 217°–219° C., [$\alpha$]$_D$ —78°. The compound showed no selective absorption in the ultraviolet spectrum and its infrared spectrum has the characteristic bands of free hydroxy groups, with absence of those of ketonic groups. The identity of the compound was proved by direct comparison of this product with the same compound prepared by a different method.

*Example II*

To a solution of 210 mg. of lithium metal in 200 cc. of liquid ammonia was slowly added under vigorous stirring, a solution of 4.8 g. of $\Delta^{8(9)}$-22-isoallospirostan-3$\beta$-ol-11-one propionate in 40 cc. of dioxane. After adding approximately 80% of this solution, the blue color was discharged. For this reason small pieces of lithium were added to the mixture until the permanent blue color reappeared. Approximately 40 g. of lithium were required for this purpose. The excess lithium was decomposed by adding an excess of tertiary butanol and then solid ammonium chloride. The ammonia was evaporated, water was added and the organic product was extracted with benzene, washed, dried and evaporated to dryness. The residue was dissolved in a solution of 4 g. of potassium hydroxide in 50 cc. of methanol and the mixture was refluxed for one hour. It was then poured into water and the precipitate was washed to neutral and dried. The product was dissolved in a mixture of benzene and hexane and passed through a column with 20 g. of aluminum oxide, thus giving 2.1 g. of 22-isoallospirostan-3$\beta$-ol-11-one with a melting point of 223°–225° C., [$\alpha$]$_D$ —29° (chloroform).

*Example III*

4.8 g. of $\Delta^{8(9)}$-22-isoallospirosten-3$\beta$-ol-11-one propionate were treated in exactly the same way as described in Example II except that no tertiary butanol was added. 22-isoallospirostan-3$\beta$-ol-11-one was obtained with a melting point of 221°–224° C., [$\alpha$]$_D$ —29° (chloroform).

*Example IV*

4.8 g. of $\Delta^{8(9)}$-22-isoallospirosten-3$\beta$-ol-11-one propionate were treated in exactly the same way as described in Example II except that sodium metal was used instead of lithium. The reaction product had a melting point of 220°–224° C., [$\alpha$]$_D$ —29° (chloroform) and was identical to the one obtained according to the previous examples.

Acetylation by known methods yielded 22-isoallospirostan-3$\beta$-ol-11-one acetate with a melting point of 223°–227° C., [$\alpha$]$_D$ —41° (chloroform).

We claim:

1. A method for producing saturated 11-oxygenated steroids of the sapogenin series from corresponding $\Delta^{8(9)}$-11-keto steroids of the sapogenin series which comprises treating the $\Delta^{8(9)}$-11-keto steroids with an alkali metal selected from the group consisting of sodium and lithium in solution in liquid ammonia.

2. The method of claim 1 wherein the $\Delta^{8(9)}$-11-keto steroid is selected from the group consisting of $\Delta^{8(9)}$-22-isoallospirosten-3$\beta$-ol-11-one lower fatty acid esters and benzoic acid esters thereof.

3. The method of claim 1 wherein the reaction takes place in the presence of a low molecular weight alcohol and the product is a corresponding saturated 11$\alpha$-hydroxy steroid.

4. The method of claim 1 wherein the reaction takes place in the presence of methanol and the product is a corresponding saturated 11$\alpha$-hydroxy steroid of the sapogenin series.

5. A method for the production of a spirostan-3-ol-11-one which comprises treating the corresponding $\Delta^{8(9)}$-spirosten-3-ol-11-one selected from the group consisting of lower fatty acid esters and benzoic acid esters thereof with an alkali metal selected from the group consisting of sodium and lithium in solution in liquid ammonia and thereafter treating the reaction product with a saponifying agent.

6. The method of claim 5 wherein the spirostan-3-ol-11-one is 22-isoallospirostan-3$\beta$-ol-11-one and the $\Delta^{8(9)}$-spirosten-3-ol-11-one ester is a $\Delta^{8(9)}$-22-isoallospirosten-3$\beta$-ol-11-one ester.

7. A method for the preparation of 22-isoallospirostan-3$\beta$,11$\alpha$-diol which comprises treating a compound selected from the group consisting of $\Delta^{8(9)}$-22-isoallospirosten-3$\beta$-ol-11-one lower fatty acid esters and benzoic acid esters thereof with an alkali metal selected from the group consisting of sodium and lithium in solution in liquid ammonia and in the presence of methanol.

No references cited.